(12) United States Patent
Howell et al.

(10) Patent No.: US 10,107,187 B2
(45) Date of Patent: Oct. 23, 2018

(54) PILOTING OF A BEARING HOUSING-SUPPORTED ADJUSTMENT RING

(71) Applicant: BorgWarner Inc., Auburn Hills, MI (US)

(72) Inventors: Ryan Howell, Hendersonville, NC (US); Greg Williams, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 100 days.

(21) Appl. No.: 14/955,126

(22) Filed: Dec. 1, 2015

(65) Prior Publication Data

US 2016/0169094 A1 Jun. 16, 2016

Related U.S. Application Data

(60) Provisional application No. 62/089,895, filed on Dec. 10, 2014.

(51) Int. Cl.
| | |
|---|---|
| *F01D 17/16* | (2006.01) |
| *F02B 33/40* | (2006.01) |
| *F02B 37/00* | (2006.01) |
| *F02B 37/22* | (2006.01) |
| *F02B 37/24* | (2006.01) |

(52) U.S. Cl.
CPC ............ *F02B 37/24* (2013.01); *F01D 17/165* (2013.01); *F05D 2220/40* (2013.01); *F05D 2270/58* (2013.01); *Y02T 10/144* (2013.01)

(58) Field of Classification Search
CPC .... F01D 17/165; F02B 37/24; F05D 2220/40; F05D 2270/58; Y02T 10/144
See application file for complete search history.

(56) References Cited

U.S. PATENT DOCUMENTS

| | | | |
|---|---|---|---|
| 2008/0075582 A1* | 3/2008 | Sausse | F01D 17/165 415/159 |
| 2013/0180106 A1* | 7/2013 | Ramb | F01D 17/165 29/888.024 |

* cited by examiner

*Primary Examiner* — Brandon Lee
(74) *Attorney, Agent, or Firm* — BrooksGroup

(57) ABSTRACT

A variable turbine geometry turbine turbocharger (1) includes vanes (30) configured to control flow of exhaust gas to a turbine wheel (12), and an adjustment ring (40) connected to each vane (30) that controls the angular orientation of all the vanes (30) in unison. The adjustment ring (40) is supported on the bearing housing (16) and is supported on, and piloted relative to, an axially extending nose portion (17) of the bearing housing (16) by surface features (60) formed along an inner edge (43) of the adjustment ring (40).

14 Claims, 11 Drawing Sheets

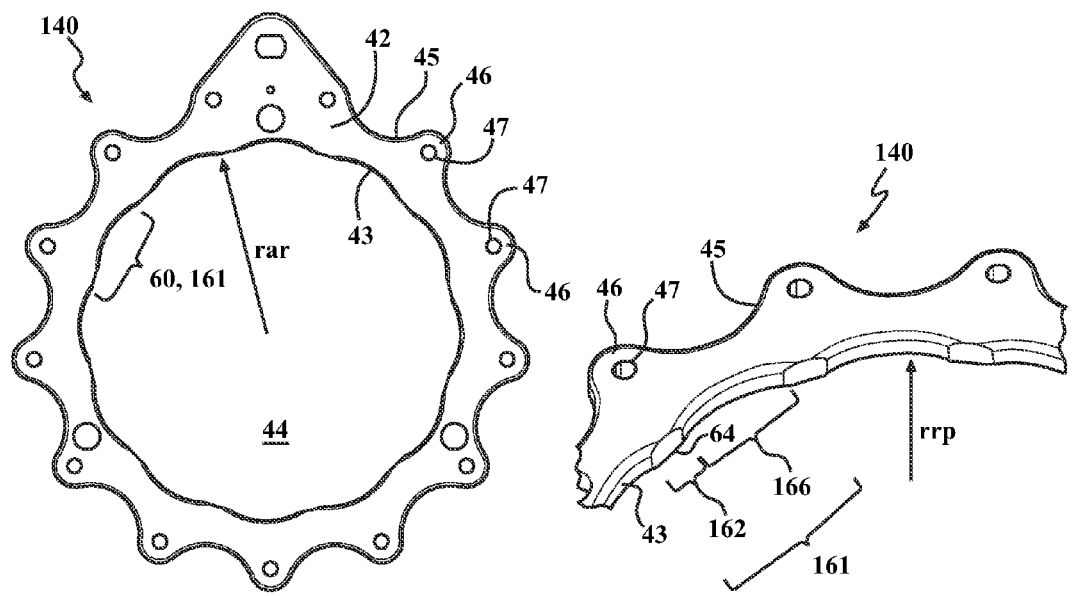
FIG. 7
FIG. 8
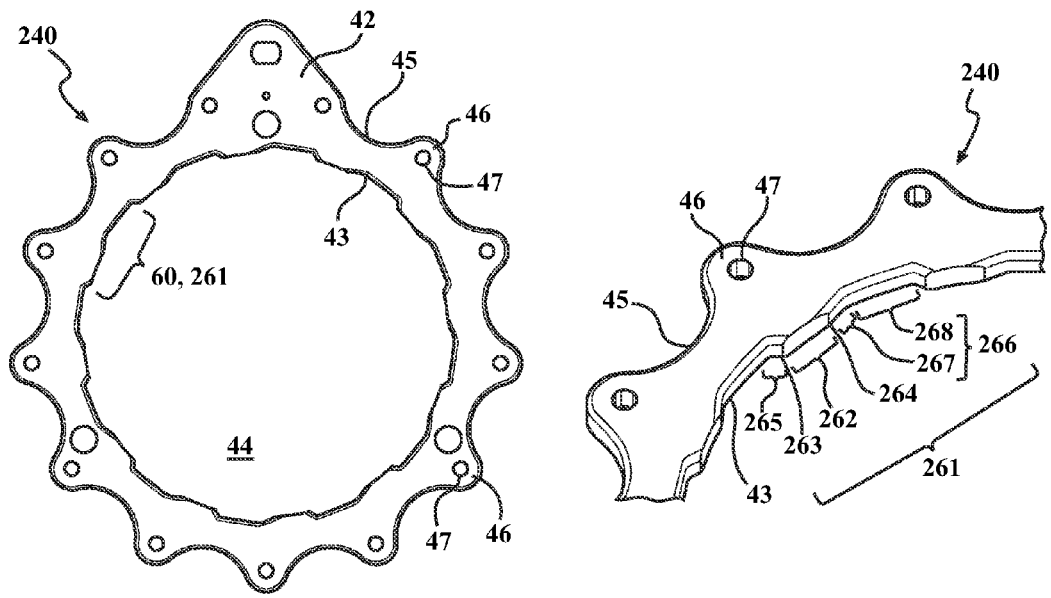
FIG. 9
FIG. 10

PILOTING OF A BEARING HOUSING-SUPPORTED ADJUSTMENT RING

CROSS-REFERENCE TO RELATED APPLICATIONS

This application claims priority to and all the benefits of U.S. Provisional Application No. 62/089,895, filed on Dec. 10, 2014, and entitled "Piloting of a Bearing Housing Supported Adjustment Ring", which is incorporated herein by reference

FIELD OF THE INVENTION

Embodiments are generally related to turbochargers and, more particularly, to an adjustment ring for use in variable turbine geometry (VTG) turbochargers.

BACKGROUND

Exhaust gas turbochargers are provided on an engine to deliver air to the engine intake at a greater density than would be possible in a normal aspirated configuration. Turbochargers typically include a turbine housing connected to the exhaust manifold of the engine, a compressor housing connected to the intake manifold of the engine, and a bearing housing coupled between the turbine and compressor housings. A turbine wheel in the turbine housing is rotatably driven by an inflow of exhaust gas supplied from the exhaust manifold. A shaft rotatably supported in the bearing housing connects the turbine wheel to a compressor impeller in the compressor housing so that rotation of the turbine wheel causes rotation of the compressor impeller. Rotation of the compressor impeller increases the air mass flow rate, airflow density and air pressure delivered to cylinders of the engine via the intake manifold.

Thus, turbochargers deliver compressed air to an engine allowing fuel to combust more efficiently. A diesel engine operates at higher air-to-fuel ratios with higher efficiency compared to other engine cycles. Turbocharging is an efficient approach to increasing air-to-fuel ratio for the diesel engine combustion cycle. In the case of other engine configurations and combustion cycles, turbocharging is an effective method for increasing power density. An increase in power density allows the use of smaller, lighter engines at similar power levels. The use of a smaller engine in a vehicle decreases the mass of the vehicle, increases performance, and enhances fuel economy. Moreover, turbochargers provide a more complete combustion of the fuel delivered to the engine, which reduces engine emissions.

SUMMARY

In some aspects, a turbocharger includes a bearing housing, a turbine housing and a variable turbine geometry (VTG) device disposed in the turbine housing. The bearing housing includes a bore that defines a longitudinal axis, and a nose portion that protrudes axially from one end of the bearing housing and at least partially surrounds the bore. The turbine housing is secured to the bearing housing and defines an exhaust gas inlet, an exhaust gas outlet and a volute disposed between the exhaust gas inlet and the exhaust gas outlet. A turbine wheel is disposed in the turbine housing between the volute and the exhaust gas outlet. The VTG device is disposed in the turbine housing between the volute and the turbine wheel. The VTG device includes pivotable vanes that control the flow of exhaust gas to the turbine wheel, and an adjustment ring that controls the rotational orientation of the vanes, the adjustment ring rotatably supported on the nose portion.

The turbocharger may include one or more of the following features: one of a radially inward-facing edge of the adjustment ring and a radially outward-facing surface of the nose portion comprising piloting surface features that center the adjustment ring relative to the nose portion; the piloting surface features comprising surface features formed on the radially inward-facing edge of the adjustment ring; the piloting surface features comprising circumferentially spaced protrusions formed on the radially inward-facing edge of the adjustment ring wherein each protrusion defines a contact area having a curvature that corresponds to the curvature of the nose portion; a radially inward-facing edge of the adjustment ring comprising piloting surface features that center the adjustment ring relative to the nose portion, and the piloting surface features including a profile segment having a contact area, a first relief portion that is recessed relative to and adjoins one end of the contact area, and a second relief portion that is recessed relative to and adjoins an opposed end of the contact area; a radially inward-facing edge of the adjustment ring comprising piloting surface features that center the adjustment ring relative to the nose, and the piloting surface features include a profile segment having a contact area that engages the nose portion, a ramp portion that is angled relative to and adjoins one end of the contact area, and a relief portion that adjoins an opposed end of the contact area and is radially spaced from the nose portion; the profile segment when viewed along the longitudinal axis providing the radially inward-facing edge of the adjustment ring with an irregular profile that extends circumferentially along a segment of the adjustment ring inner edge and is repeated along the circumference of the adjustment ring inner edge to provide a regularly repeating profile pattern along the adjustment ring inner edge; the piloting surface features comprising surface features formed on the radially outward-facing surface of the nose portion; the piloting surface features comprising circumferentially spaced protrusions formed on the radially outward-facing surface of the nose portion, each protrusion defining a contact area that engages the adjustment ring; the bearing housing including an insert that surrounds the nose portion and provides a bearing surface for the adjustment ring, the adjustment ring is rotatably supported on the insert and the insert is formed of a material that is different than the material used to form the bearing housing nose portion; and one of a radially inward-facing edge of the adjustment ring and a radially outward-facing surface of the insert comprising piloting surface features that center the adjustment ring relative to the nose portion.

In some aspects, an adjustment ring is configured to control the rotational orientation of vanes of a variable turbine geometry (VTG) device of a turbocharger. The adjustment ring has the form of an annular plate and includes a radially inward-facing inner edge that defines a central opening. The inner edge has a non-circular profile and includes piloting surface features that define a bearing surface upon which the adjustment ring is supported relative to turbocharger.

The adjustment ring may include one or more of the following features: piloting surface features comprising circumferentially spaced protrusions formed on the radially inward-facing inner edge of the adjustment ring, wherein each protrusion defines a curved contact area; the piloting surface features including a profile segment having a contact area, a first relief portion that is recessed relative to and adjoins one end of the contact area, and a second relief portion that is recessed relative to and adjoins an opposed end of the contact area; the profile segment providing the radially inward-facing edge of the adjustment ring with an irregular profile that extends circumferentially along a segment of the inner edge and is repeated along the circumference of the inner edge to provide a regularly repeating profile pattern along the inner edge; and the adjustment ring including a radially-outward facing outer edge that has a scalloped profile.

A turbocharger provides an ideal boost in only a limited range of conditions. Thus, in general, a larger turbine for a given engine provides good boost at high speeds, but does not do well at low speeds because the turbocharger suffers turbo lag and is thus unable to provide boost when needed. A small turbine provides good boost at low speeds, but can choke the engine at high speeds. One solution to this problem is to provide the turbocharger with a variable turbine geometry (VTG) turbine having a vane pack including pivotable vanes that control exhaust gas flow through the turbine. At low speeds, when boost is needed quickly, the vanes can be closed creating a narrower passage for the flow of exhaust gas. The narrow passage accelerates the exhaust gas towards the turbine wheel blades allowing the turbocharger to provide a boost of power to the engine when needed. On the other hand, when the engine is running at high speed and the pressure of the exhaust gas is high, the vanes may be opened and the turbocharger provides the appropriate amount of boost to the engine for the associated speed. By allowing the vanes to open and close, the turbocharger is permitted to operate under a wide variety of driving conditions as power is demanded by the engine.

An adjustment ring is used to facilitate vane position adjustment in a VTG turbine turbocharger. The adjustment ring is an important part of the overall VTG device because the adjustment ring is the link between the vane pack, which supports the vanes, and the adjustment shaft, which connects the VTG device to an actuator. In particular, the adjustment ring is used to control the position of the vanes relative to the turbine housing. As such, the adjustment ring plays a critical role in the structure and function of the VTG turbine, and can affect turbocharger efficiency.

In some aspects, the adjustment ring, along with the vane pack, is rotatably supported on an axially protruding nose portion of the bearing housing. Since the adjustment ring and vane pack are supported on the bearing housing, the adjustment ring and vane pack are thermally decoupled from the turbine housing. Thermally decoupling the adjustment ring and vane pack the turbine housing is advantageous relative to some conventional VTG turbine turbochargers whereby the vane pack and adjustment ring are supported on the turbine housing or other components directly exposed to exhaust gas flow, because the high temperatures experienced by these components during use are conducted to the vane pack, and sometimes lead to adverse events such distortion of the adjustment ring and/or vane pack and lock up of the vanes.

In some aspects, one of a radially inward-facing surface of the adjustment ring and a radially outward-facing surface of the bearing housing nose includes piloting surface features that center the adjustment ring relative to the bearing housing nose portion. This feature allows the adjustment ring to be positioned closer to the bearing housing when compared to the position of the adjustment ring in some conventional VTG turbine turbochargers allowing for a lower temperature placement, whereby the axial dimension of the turbocharger can be reduced and packaging of the turbocharger within a vehicle can be improved.

In addition, use of piloting surface features permits improved control over the rotational orientation of the adjustment ring and vane pack relative to the bearing housing, relative to some conventional VTG turbine turbochargers. This is because in some conventional VTG turbine turbochargers, the adjustment ring and vane pack are supported by the turbine housing or adjoining components. Although the rotational orientation of the vane pack and adjustment ring can be fairly well controlled when they are mounted to the turbine housing or adjoining components, the rotational orientation of the turbine housing relative to the bearing housing is not very well controlled. When combined with the need to provide additional clearance to accommodate thermal growth during operation, errors in the rotational orientation of the turbine housing relative to the bearing housing can introduce positioning errors of the adjusting ring relative to the vane pack in some conventional devices. Controlling the rotational orientation and concentricity of the adjustment ring relative to the vane obtained by the disclosed device, results in improved vane angle accuracy throughout the turbocharger life.

In some embodiments, the piloting surface features comprise surface features formed on the radially inward-facing surface of the adjustment ring, and the piloting surface features engage a circular, radially outward-facing surface of the bearing housing. In other embodiments, the piloting surface features comprise surface features formed on the radially outward-facing surface of the bearing housing, and the piloting surface features engage a circular, radially inward-facing surface of the adjustment ring. In any case, the features provide an area of contact between the adjustment ring and the bearing housing, while still having a shape that allows debris that would otherwise accumulate between these structures to work itself out from between these structures as the adjustment ring is actuated. The piloting surface features reduce wear and binding, and thus provide improved durability.

BRIEF DESCRIPTION OF THE DRAWINGS

Advantages of the VTG turbocharger disclosed herein will be better understood by reference to the following detailed description when considered in connection with the accompanying drawings wherein:

FIG. 7 an end view of an alternative embodiment adjustment ring isolated from the turbocharger;

FIG. 8 is an enlargement of a portion of the adjustment ring of FIG. 7;

FIG. 9 an end view of another alternative embodiment adjustment ring isolated from the turbocharger;

FIG. 10 is an enlargement of a portion of the adjustment ring of FIG. 9;

DETAILED DESCRIPTION

Figure 1:
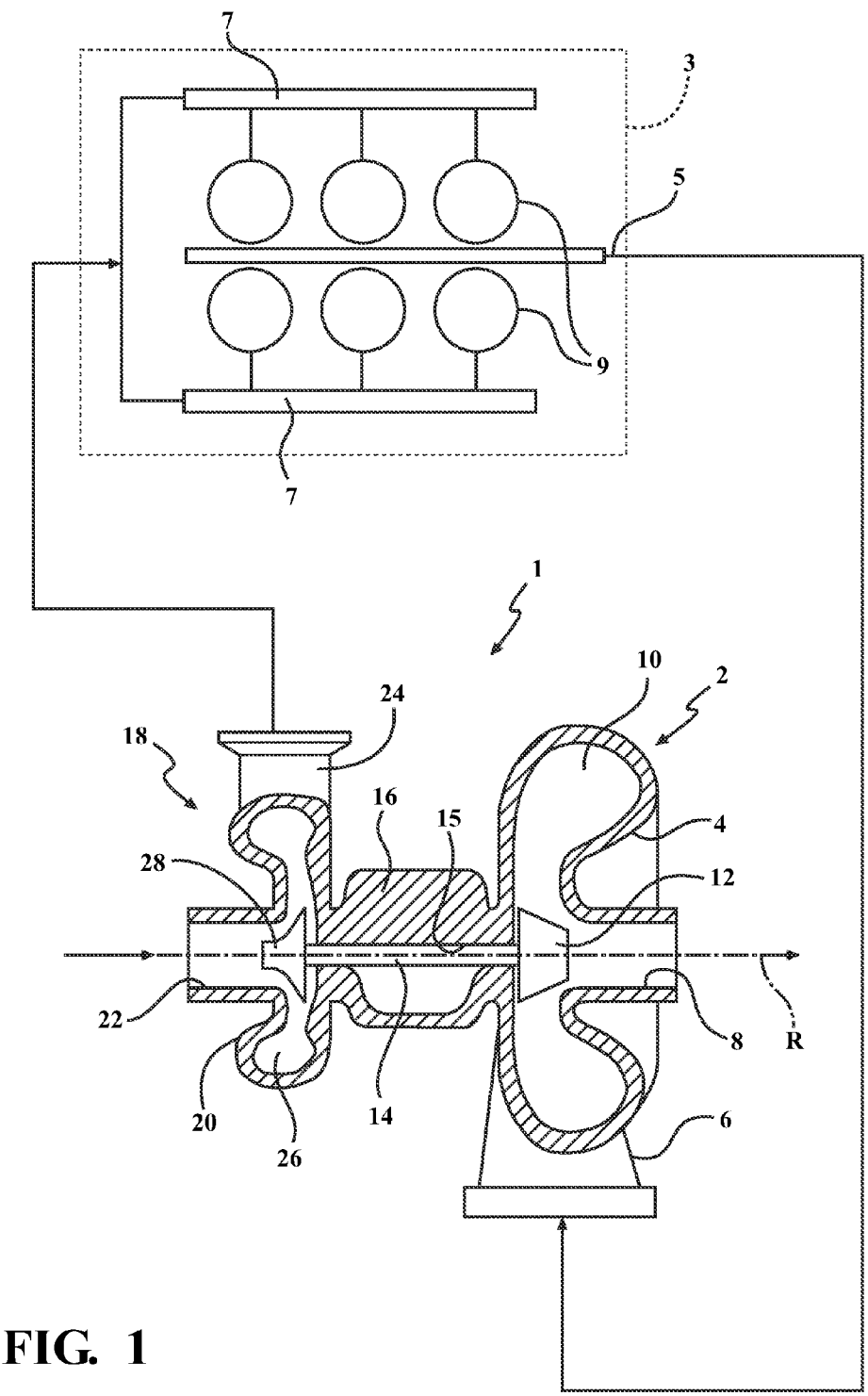
FIG. 1 is a schematic view of an engine system that includes an engine and an exhaust gas turbocharger connected to the engine intake and exhaust lines.

Referring to FIG. 1, an exhaust gas turbocharger 1 is integrated into an engine 3 of a vehicle (not shown). The turbocharger 1 is connected to the engine 3, and includes a turbine section 2, a compressor section 18, and a bearing housing 16 disposed between and connecting the compressor section 18 to the turbine section 2. The turbine section 2 includes a turbine housing 4 that defines an exhaust gas inlet 6, an exhaust gas outlet 8, and a turbine volute 10 disposed in the fluid path between the exhaust gas inlet 6 and the exhaust gas outlet 8. A turbine wheel 12 is disposed in the turbine housing 4 between the turbine volute 10 and the exhaust gas outlet 8. A shaft 14 is connected to the turbine wheel 12, is supported for rotation about a rotational axis R within a bore 15 formed in the bearing housing 16, and extends into the compressor section 18. The compressor section 18 includes a compressor housing 20 that defines an axially-extending air inlet 22, an air outlet 24, and a compressor volute 26. A compressor wheel 28 is disposed in the compressor housing 20 between the air inlet 22 and the compressor volute 26, and is connected to the shaft 14.

In use, the turbine wheel 12 in the turbine housing 4 is rotatably driven by an inflow of exhaust gas supplied from the exhaust manifold 5 of the engine 3. The rotation of the turbine wheel 12 causes rotation of the compressor wheel 28 via the shaft 14. As the compressor wheel 28 rotates, it increases the air mass flow rate, airflow density and air pressure delivered to the cylinders 9 of the engine 3 via an outflow from the compressor air outlet 24, which is connected to the air intake manifold 7 of the engine 3.

Figure 2:
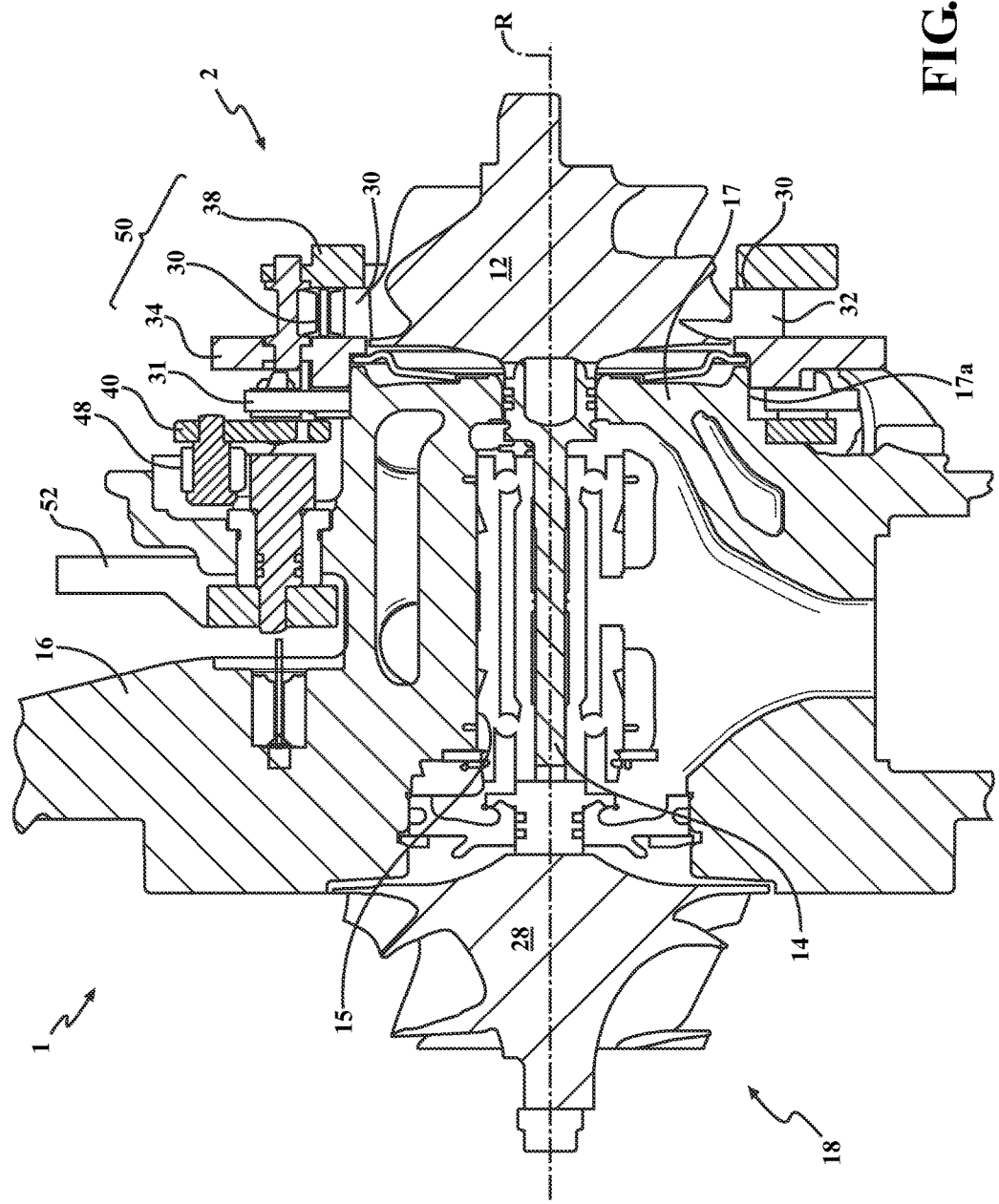
FIG. 2 is a cross-sectional view of the exhaust gas turbocharger of FIG. 1 with the compressor housing and turbine housing omitted for clarity.
Figure 3:
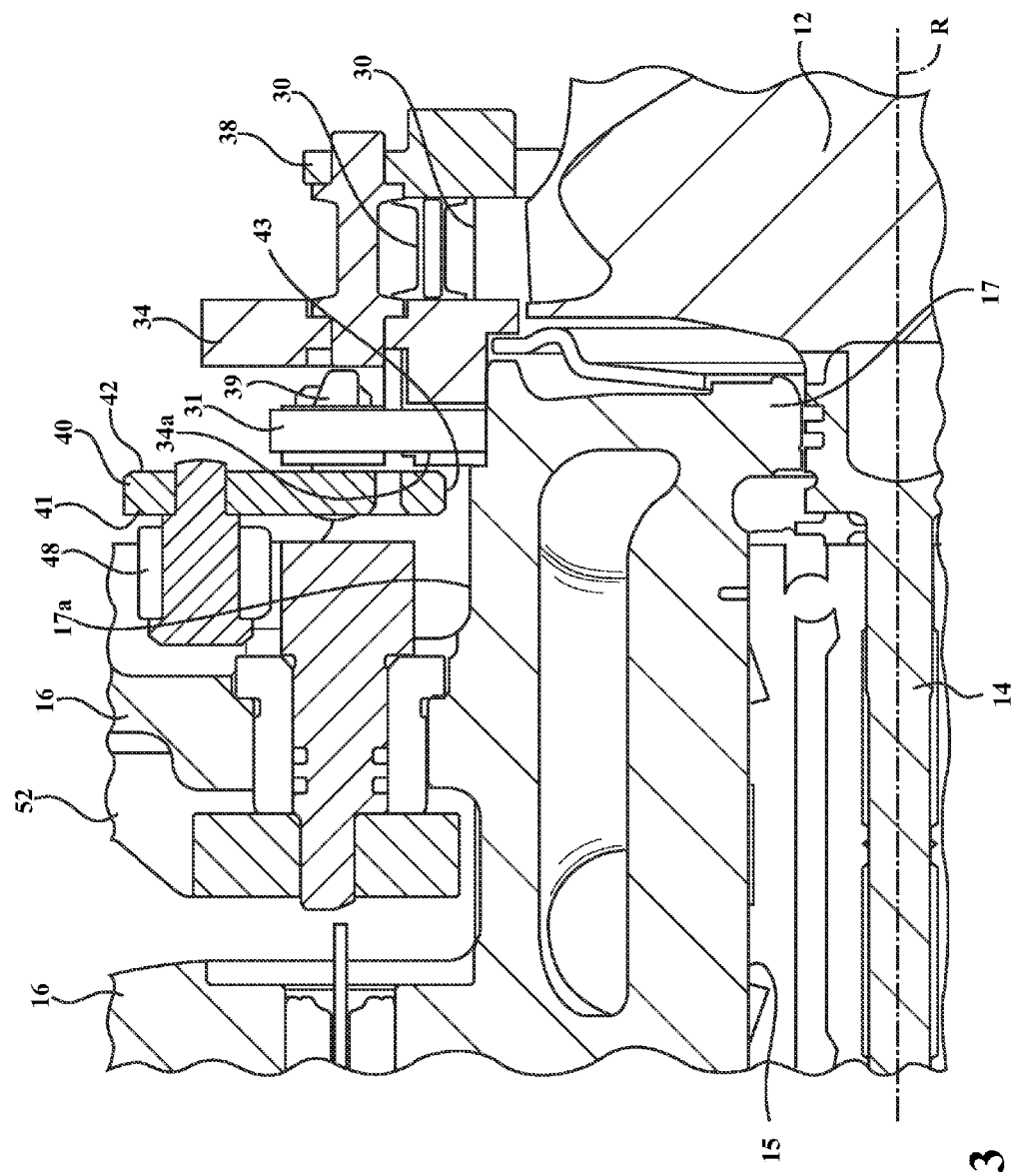
FIG. 3 is an enlargement of a portion of FIG. 2 showing a cross-sectional view of the VTG device of the exhaust gas turbocharger of FIG. 1.
Figure 4:
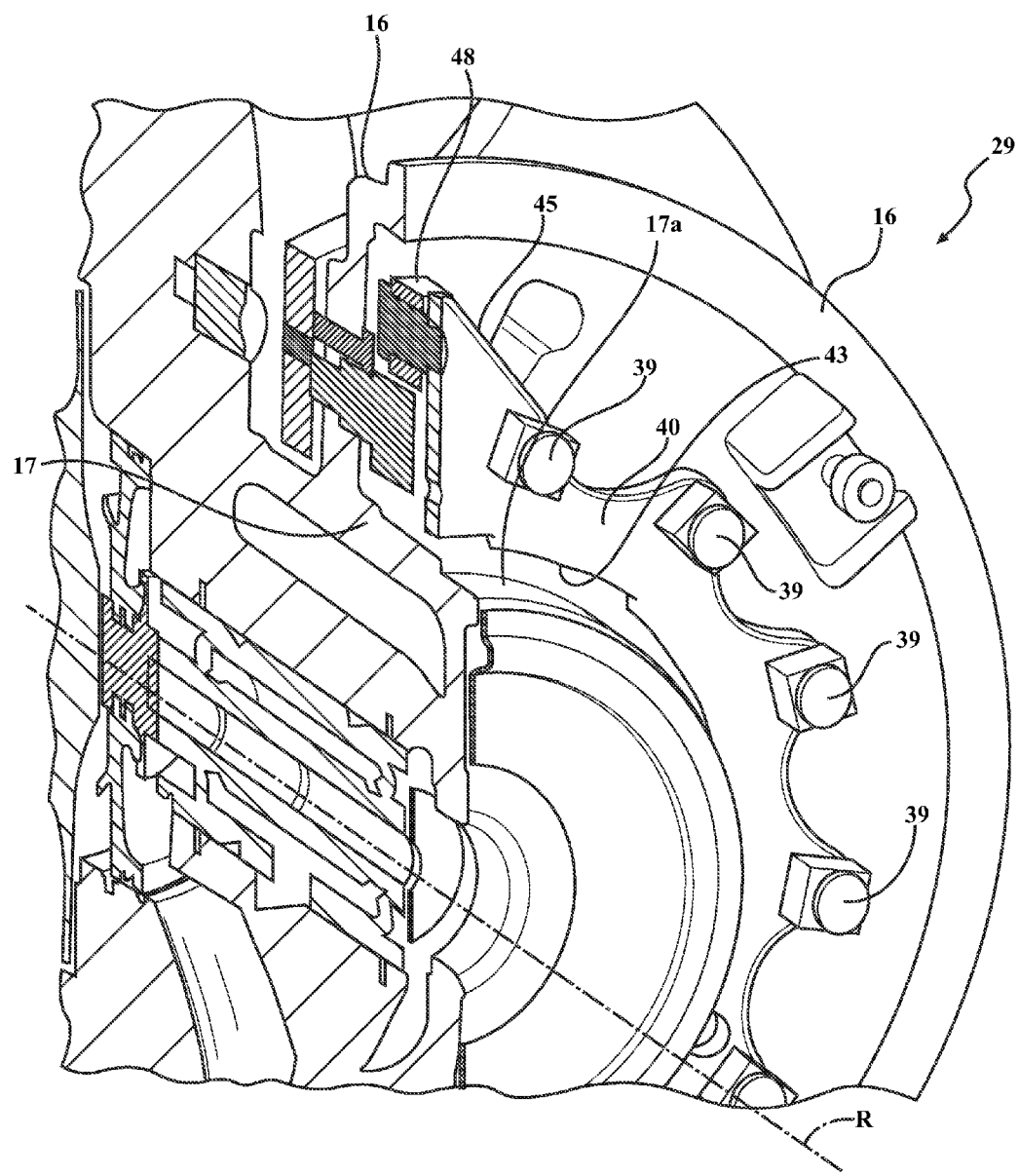
FIG. 4 is a partial perspective view of the turbocharger of FIG. 1 with the turbine housing, the rotating assembly and the vane pack omitted for clarity and illustrating the adjustment ring supported on the bearing housing.

Referring also to FIGS. 2-4, the turbocharger 1 is a variable turbine geometry (VTG) turbocharger. In particular, the turbine section 2 includes a VTG device 29 having plurality of pivotable vanes 30 that control the flow of exhaust gas that impinges on the turbine wheel 12 and thus control the power of the turbine section 2. The vanes 30 also therefore control the pressure ratio generated by the compressor section 18. In engines that control the production of NOx by the use of High Pressure Exhaust Gas Recirculation (HP EGR) techniques, the vanes 30 also provide a means for generating and controlling exhaust back pressure.

The vanes 30 are arranged in a circular array around the turbine wheel 12, and are located between the turbine volute 10 and the turbine wheel 12. The vanes 30 are pivotably supported in this configuration between an upper vane ring 34 disposed on a bearing housing-facing side of the vanes 30, and a lower vane ring 38 disposed on a turbine housing-facing side of the vanes 30. The subassembly consisting of the plurality of vanes 30, the upper vane ring 34 and the lower vane ring 38 is referred to as the vane pack 50.

Each vane 30 rotates on a post 32 that protrudes from the opposed side faces of the vane 30. Opposed free ends of the post 32 are received in respective apertures (not shown) in the lower vane ring 38 and the upper vane ring 34. The angular orientation of the upper vane ring 34 relative to the lower vane ring 38 is set such that the corresponding apertures (not shown) in the upper and lower vane rings 34, 38 are concentric with the shaft rotational axis R, and the vane 30 is free to rotate about a longitudinal axis of the post 32. Each post 32 on the upper vane ring-side of the vane 30 protrudes (as at 34a) through corresponding aperture (not shown) of the upper vane ring 34 and is affixed to a vane arm 31, which controls the rotational position of the vane 30 with respect to the vane rings 34, 38.

The orientation of the vanes 30 within the vane pack 50 is controlled using an adjustment ring 40. The adjustment ring 40 is connected to each vane 30 via a pin-and-block assembly 39 that engages the corresponding vane arm 31. Thus, the position of each vane 30 is adjusted in unison with the other vanes 30 as the adjustment ring 40 is rotated about the rotational axis R. The rotational orientation of the adjustment ring 40 about the rotational axis R is controlled by an actuator (not shown) which is operatively connected to rotate the adjustment ring 40 via a linkage 52 (shown in part) that engages a large block 48 that is pivotably secured to the adjustment ring 40. The actuator is typically commanded by the engine electronic control unit (ECU).

Figure 5:
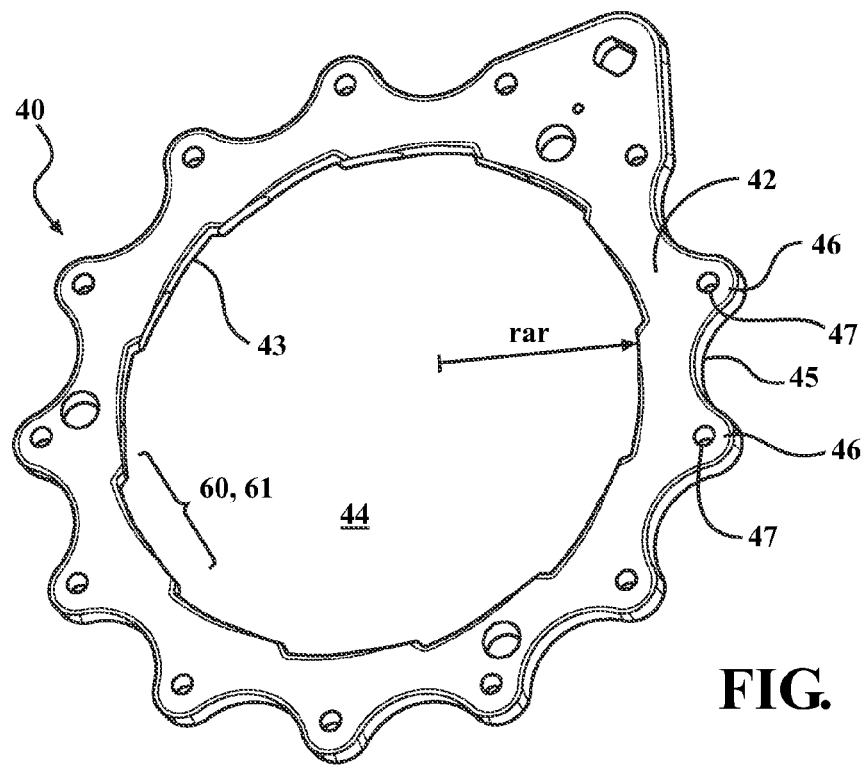
FIG. 5 a perspective view of the adjustment ring isolated from the turbocharger.
Figure 6:
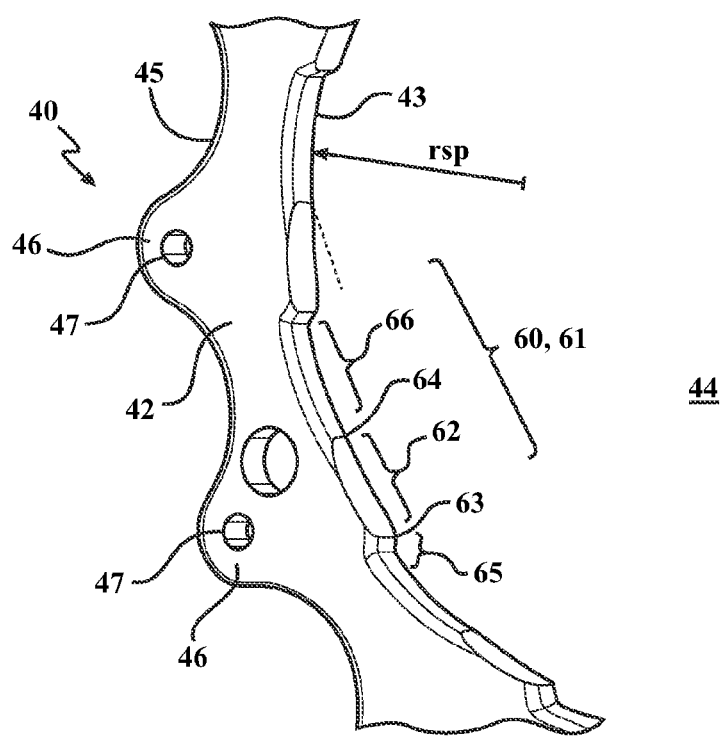
FIG. 6 is an enlargement of a portion of the adjustment ring of FIG. 5.

Referring to FIGS. 5 and 6, the adjustment ring 40 is an annular plate having a bearing housing-facing surface 41 (shown in FIG. 3), and an opposed, turbine housing-facing surface 42. The adjustment ring 40 includes a radially outward-facing outer edge 45 that has a scalloped profile when viewed along the rotational axis R. The scalloped profile of the radially outward-facing outer edge 45 includes rounded, radially outwardly-protruding apexes 46. Each rounded, radially outwardly-protruding apexes 46 includes a hole 47 that receives one of the pin-and-block assemblies 39. The adjustment ring 40 includes a radially inward-facing inner edge 43 that defines a central opening 44 that receives an axially-protruding nose portion 17 (shown in FIGS. 2 and 3) of the bearing housing 16. In the illustrated embodiment, the nose portion 17 has a radially outward-facing surface 17a (shown in also FIGS. 2 and 3) that is circular in shape.

The adjustment ring 40 is supported on the bearing housing nose portion 17 so as to be: a) centered on the rotational axis R and thus radially located relative to the bearing housing 16, b) axially located relative to the vane pack 50, and c) rotatable about the rotational axis R. To this end, the adjustment ring inner edge 43 has a non-circular profile when viewed along the rotational axis R. In particular, the adjustment ring inner edge 43 has piloting surface features 60 that center the adjustment ring 40 relative to the nose portion 17 and reduce contact area.

The surface features 60 are defined by a profile segment 61 having an irregular profile that protrudes slightly radially outward from and extends circumferentially along the adjustment ring inner edge 43. The profile segment 61 is repeated along the circumference of the adjustment ring inner edge 43 to provide a regularly repeating profile pattern along the adjustment ring inner edge 43. In the illustrated embodiment, twelve profile segments are provided end-to-end along the adjustment ring inner edge 43; however, the number of profile segments are may not necessarily be limited to twelve.

Each profile segment 61 includes a contact area 62, a linear ramp portion 65 that is angled relative to and adjoins one end 63 of the contact area 62, and a relief portion 66 that adjoins an opposed end 64 of the contact area 62. The contact area 62 engages the radially outward-facing surface 17a of the bearing housing nose portion 17, and is curved to generally match the curvature of the radially outward-facing surface 17a. The relief portion 66 is curved and has a radius $r_{rp}$ that is less than the radius $r_{ar}$ of the adjustment ring inner edge 43 at the contact area 62. The ramp portion 65 is relatively short in circumferential length, as it extends along about ten percent of the overall length of the profile segment 61. In contrast, the contact area 62 extends along about forty percent of the overall length of the profile segment 61 and the relief portion 66 extends along about 50 percent of the overall length of the profile segment 61.

The contact area 62 protrudes radially inward relative to the ramp portion 65 and relief portion 66, and is arranged to contact the radially outward-facing surface 17a of the bearing housing nose portion 17. By providing the contact area 62 with the adjoining ramp portion 65 and relief portion 66, the area defined by the contact area 62 increases as wear of the adjustment ring 40 occurs. This feature provides an increased support area between the adjustment ring 40 and the bearing housing nose portion 17 as clearances between these elements increase due to wear. In addition, by providing the contact area 62 with the adjoining ramp portion 65 and relief portion 66 and by providing multiples of the contact area 62, any debris that enters between the adjustment ring inner edge 43 and the radially outward-facing surface 17a of the bearing housing nose portion 17 can work itself out of this location during actuation of the adjustment ring 40.

In the embodiment illustrated in FIGS. 5 and 6, the circumferential length of the contact area 62 extends along about forty percent of the overall length of the profile segment 61, where the overall length of the profile segment 61 corresponds to one-twelfth of the circumference of the adjustment ring inner edge 43. It is understood that the circumferential length of the contact area 62 is not limited this, and will be determined based on the requirements of the specific application, and optimized to maximize the durability with minimal increase in friction.

Referring to FIGS. 7 and 8, an alternative embodiment adjustment ring 140 can be used to control the orientation of the vanes 30 within the vane pack 50. The adjustment ring 140 illustrated in FIGS. 7 and 8 has a form and function that is substantially the same as the adjustment ring 40 described above with respect to FIGS. 5 and 6, and common reference numbers will be used to refer to common elements. The adjustment ring 140 illustrated in FIGS. 7 and 8 differs from the earlier described adjustment ring 40 in that it has a differently shaped profile segment 161.

Each profile segment 161 includes a contact area 162, and a relief portion 166 that adjoins one end 164 of the contact area 162. The contact area 162 engages the radially outward-facing surface 17a of the bearing housing nose portion 17, and is curved to generally match the curvature of the radially outward-facing surface 17a. The relief portion 166 is curved and has a radius $r_{rp}$ that is less than an average radius $r_{ar}$ of the adjustment ring inner edge 43. The relief portion 166 extends between and connects adjacent contact areas 162. In this embodiment, the contact area 162 extends along about 15 to 20 percent of the overall length of the profile segment 161, and the relief portion 166 extends along about 80 to 85 percent of the overall length of the profile segment 161.

The contact area 162 is arranged to contact the radially outward-facing surface 17a of the bearing housing nose portion 17. By providing the contact area 162 with the adjoining relief portions 166, the area defined by the contact area 162 increases as wear of the adjustment ring 140 occurs. This feature provides an increased support area between the adjustment ring 140 and the bearing housing nose portion 17 as clearances between these elements increase due to wear. In this embodiment, the rate of increase of the area defined by the contact area 162 can be tuned by modifying the curvature of the relief portion 166. In addition, by providing the contact area 162 with the adjoining relief portion 166 and by providing multiples of the contact area 162, any debris that enters between the adjustment ring inner edge 43 and the radially outward-facing surface 17a of the bearing housing nose portion 17 can work itself out of this location during actuation of the adjustment ring 140.

Referring to FIGS. 9 and 10, another alternative embodiment adjustment ring 240 can be used to control the orientation of the vanes 30 within the vane pack 50. The adjustment ring 240 illustrated in FIGS. 9 and 10 has a form and function that is substantially the same as the adjustment ring 40 described above with respect to FIGS. 5 and 6, and common reference numbers will be used to refer to common elements. The adjustment ring 240 illustrated in FIGS. 9 and 10 differs from the earlier described adjustment ring 40 in that it has a differently shaped profile segment 261.

Each profile segment 261 includes a contact area 262, a linear ramp portion 265 that is angled relative to and adjoins one end 263 of the contact area 262, and a relief portion 266 that adjoins an opposed end 264 of the contact area 262. The contact area 262 engages the radially outward-facing surface 17a of the bearing housing nose portion 17, and is curved to generally match the curvature of the radially outward-facing surface 17a. The relief portion 266 is formed of two adjacent linear portions 267, 268 that define an obtuse interior angle and define a shallow departure from the radius $r_{ar}$ defined by the contact area 262. The ramp portion 265 is relatively short in circumferential length, as it extends along about ten percent of the overall length of the profile segment 261. In contrast, the contact area 262 extends along about thirty percent of the overall length of the profile segment 261 and the relief portion 266 extends along about 60 percent of the overall length of the profile segment 261.

The contact area 262 is arranged to contact the radially outward-facing surface 17a of the bearing housing nose portion 17. By providing the contact area 262 with the adjoining ramp portion 265 and relief portion 266, the area defined by the contact area 262 increases as wear of the adjustment ring 240 occurs. This feature provides an increased support area between the adjustment ring 240 and the bearing housing nose portion 17 as clearances between these elements increase due to wear. In addition, by providing the contact area 262 with the adjoining ramp portion 265 and relief portion 266, and by providing multiples of the contact area 262, any debris that enters between the adjustment ring inner edge 43 and the radially outward-facing surface 17a of the bearing housing nose portion 17 can work itself out of this location during actuation of the adjustment ring 240.

Figure 11:
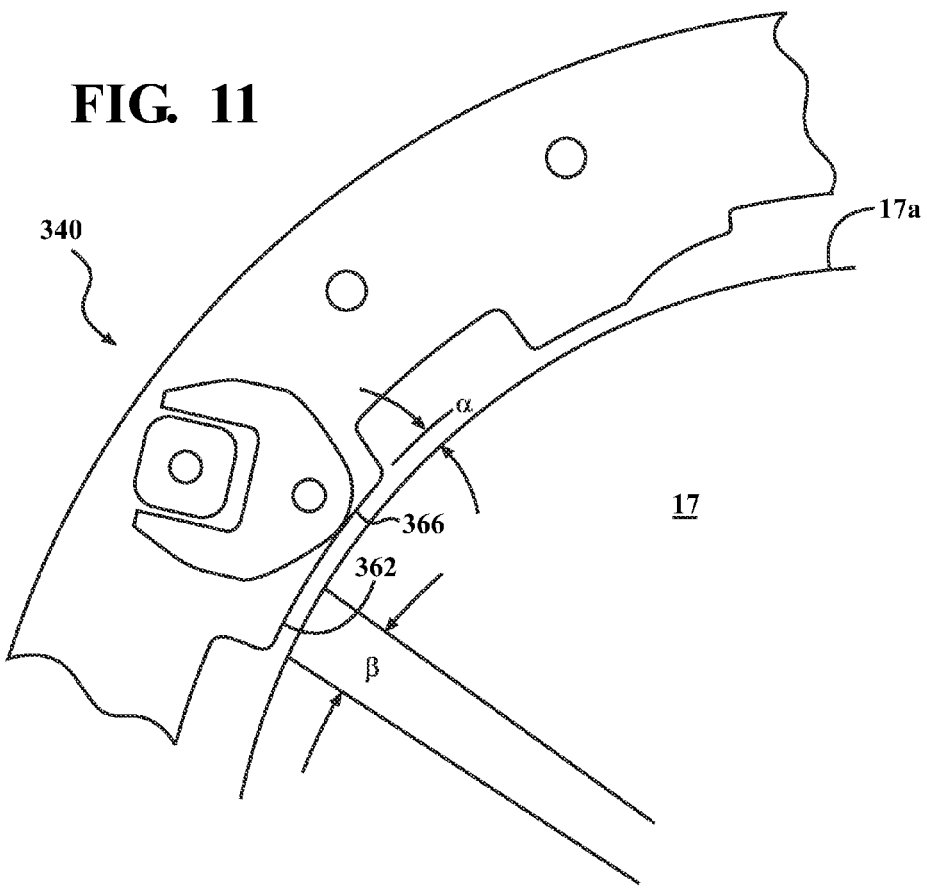
FIG. 11 is a partial end view of another alternative embodiment adjustment ring supported on a bearing housing nose portion.
Figure 12:
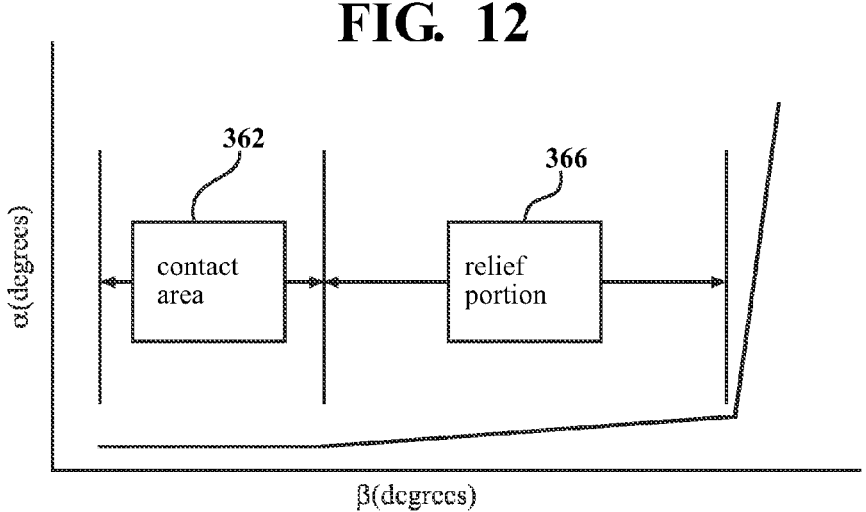
FIG. 12 is a graph of the angle β versus the angle α for an exemplary profile segment, where the angle β is the angle corresponding to an arc measured along the adjustment ring inner edge, and the angle α corresponds to an angle of departure from the curvature of the contact area of the adjustment ring inner edge.

Referring to FIGS. 11 and 12, a graph is used to illustrate the angle α as a function of the angle β for an adjustment ring 340 having an exemplary profile segment that provides piloting surface features, where the angle β is the angle corresponding to an arc measured along the adjustment ring inner edge 43, and the angle α corresponds to an angle of departure from the curvature of the contact area 362 as provided by the relief portion 366. FIG. 12 shows the angle α as zero along the contact area 362, and increasing as a linear function of β in the relief portion 366.

Figure 13:
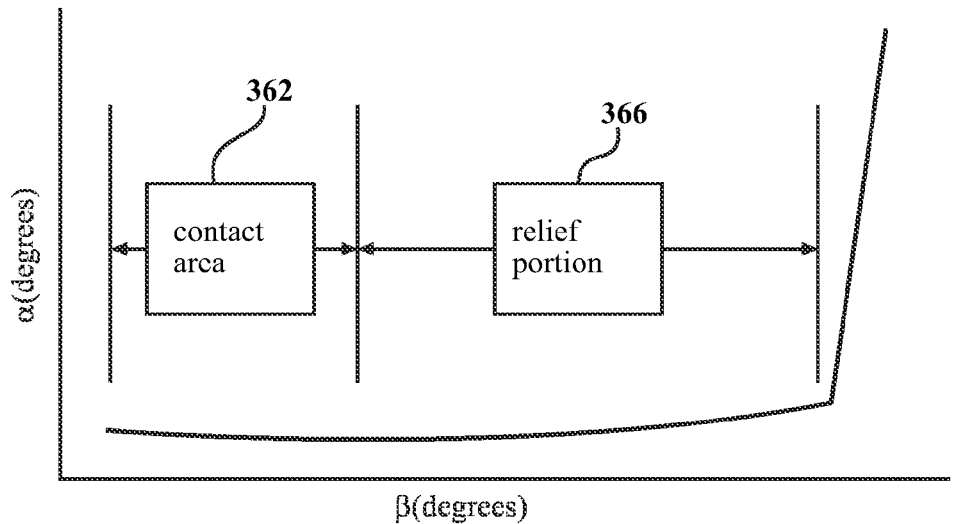
FIG. 13 is a graph of the angle β versus the angle α for another exemplary profile segment.

Referring to FIG. 13, a graph is used to illustrate another exemplary profile segment in which the angle α is zero along the contact area 362, and increases as a non-linear function of β in the relief portion 366.

Figure 14:
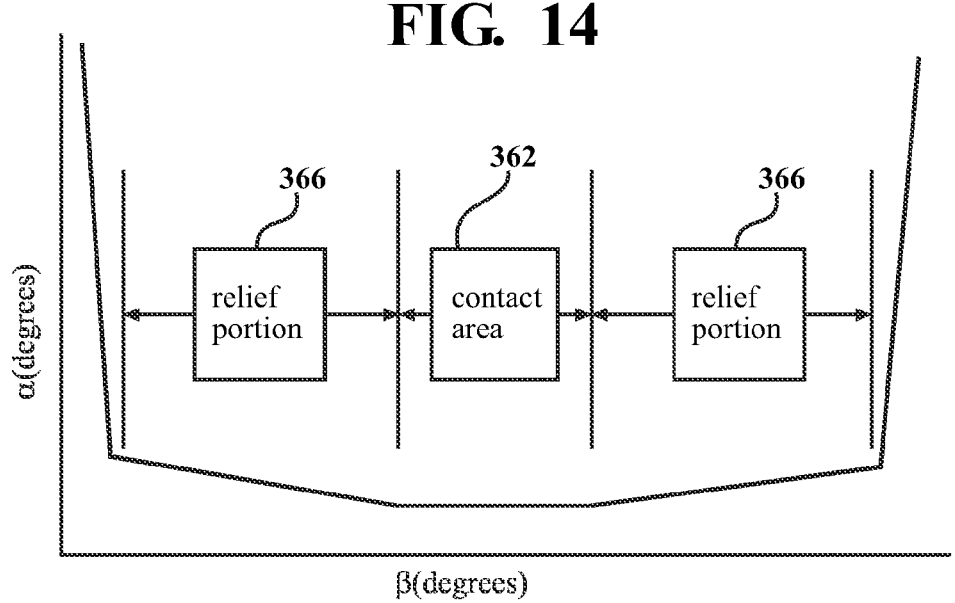
FIG. 14 is a graph of the angle β versus the angle α for yet another exemplary profile segment.

Referring to FIG. 14, a graph is used to illustrate yet another exemplary profile segment in which the angle α is zero along the contact area 362, and increases as a linear function of β on both sides of the contact area 362.

Figure 15:
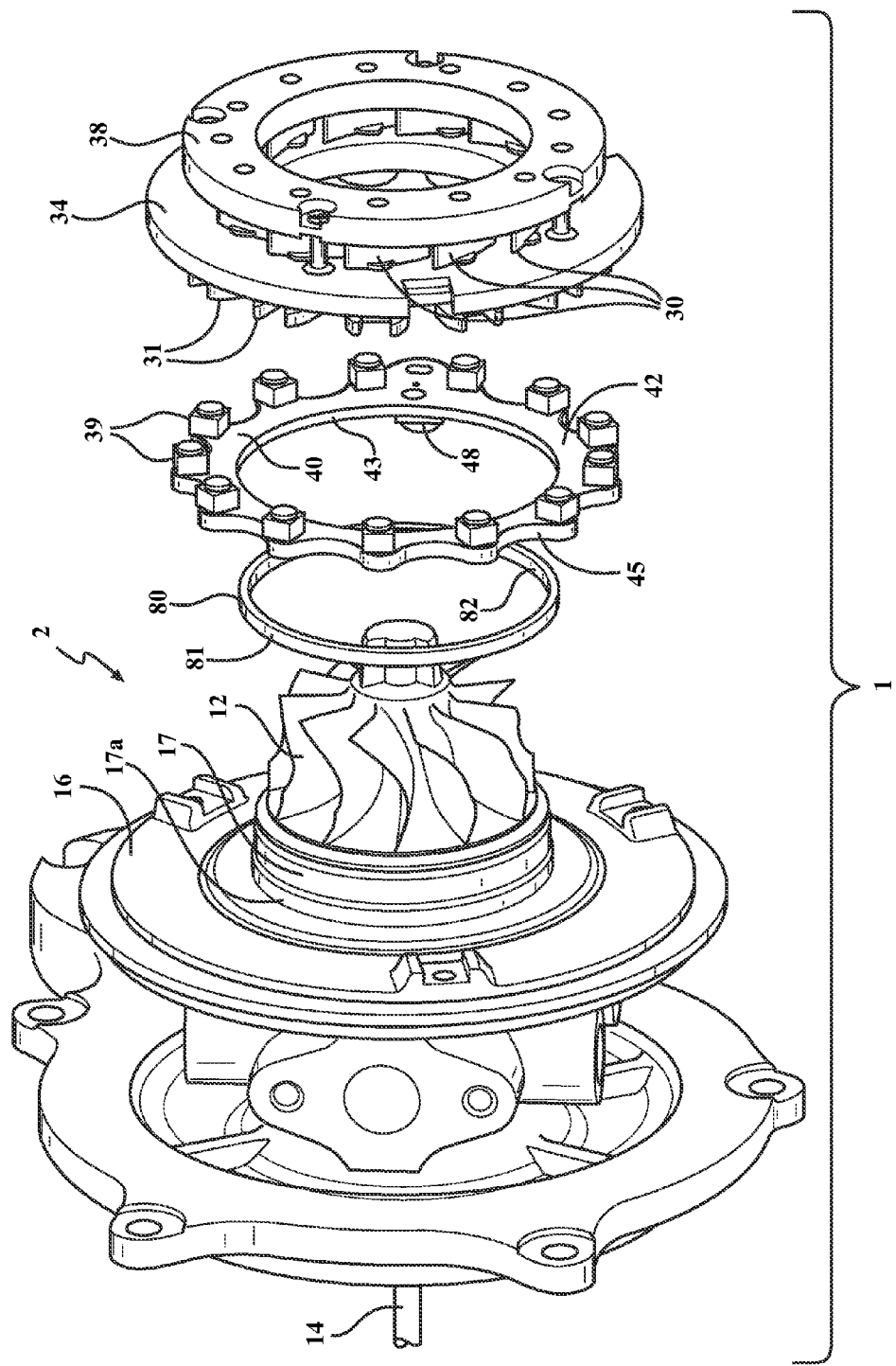
FIG. 15 is an exploded view of an alternative embodiment turbocharger including a high wear insert surrounding the nose portion of the bearing housing.
Figure 17:
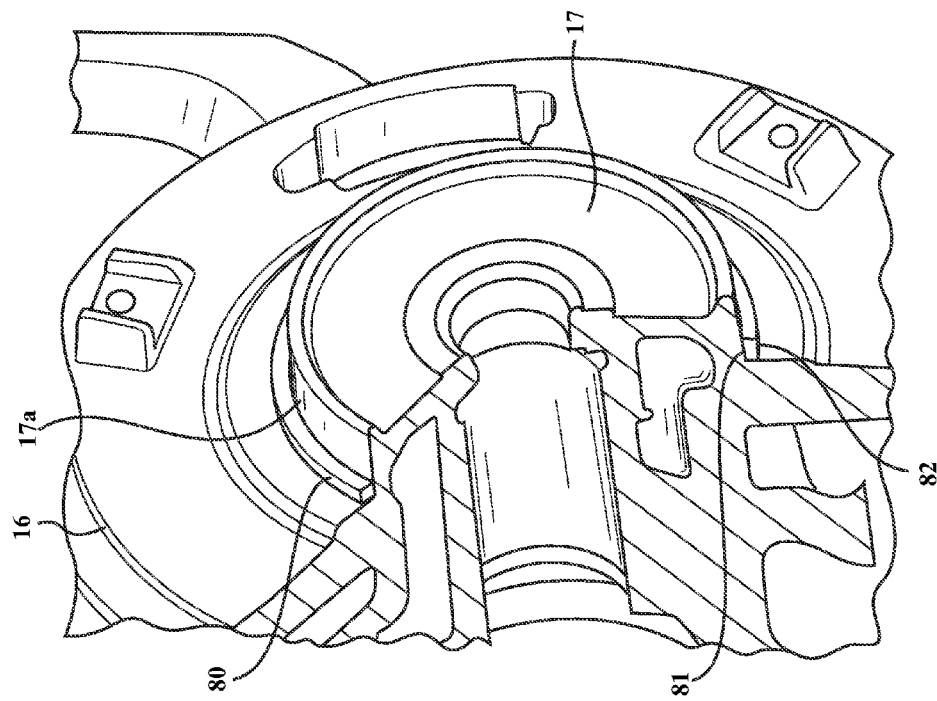
FIG. 17 is a partial cross sectional end view of the turbine section of the turbocharger illustrating the insert of FIG. 15 with the turbine housing, rotating assembly, vane pack and adjustment ring omitted for clarity.
Figure 16:
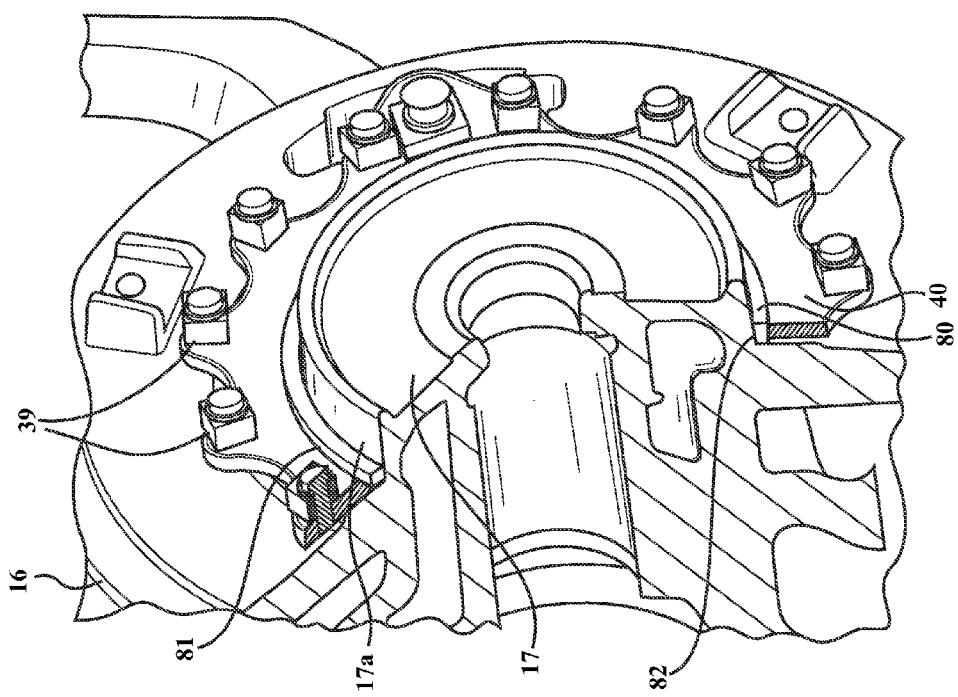
FIG. 16 is a partial cross sectional end view of the turbine section of the turbocharger illustrating the insert of FIG. 15 supporting the adjustment ring, and with the turbine housing, rotating assembly and vane pack omitted for clarity.

Referring to FIGS. 15-17, in some embodiments, in order to reduce wear, the bearing housing 16 including the nose portion 17 may be formed of a high wear (e.g., relatively hard) material relative to the material of a conventional turbocharger bearing housing. In other embodiments, the bearing housing 16 including the nose portion 17 may be formed of, for example, cast iron, and an annular insert 80 is provided that surrounds the radially outward-facing surface 17a of the nose portion 17 and is secured to this surface via press fit, adhesive, and/or other conventional methods. The insert 80 provides a circular bearing surface that supports the adjustment ring 40, 140, 240, 340. To this end, the outer and inner edges 81, 82 of the insert 80 are concentric and have a circular profile when viewed along the rotational axis R. The insert 80 is formed of a material that is different than the material used to form the bearing housing nose portion (17a) such as a high wear (e.g., relatively hard) material relative to that of the nose portion 17 in order to reduce wear and provide a durable pilot surface for engagement with contact areas 62, 162, 262, 362 of the adjustment ring 40, 140, 240, 340.

Figure 18:
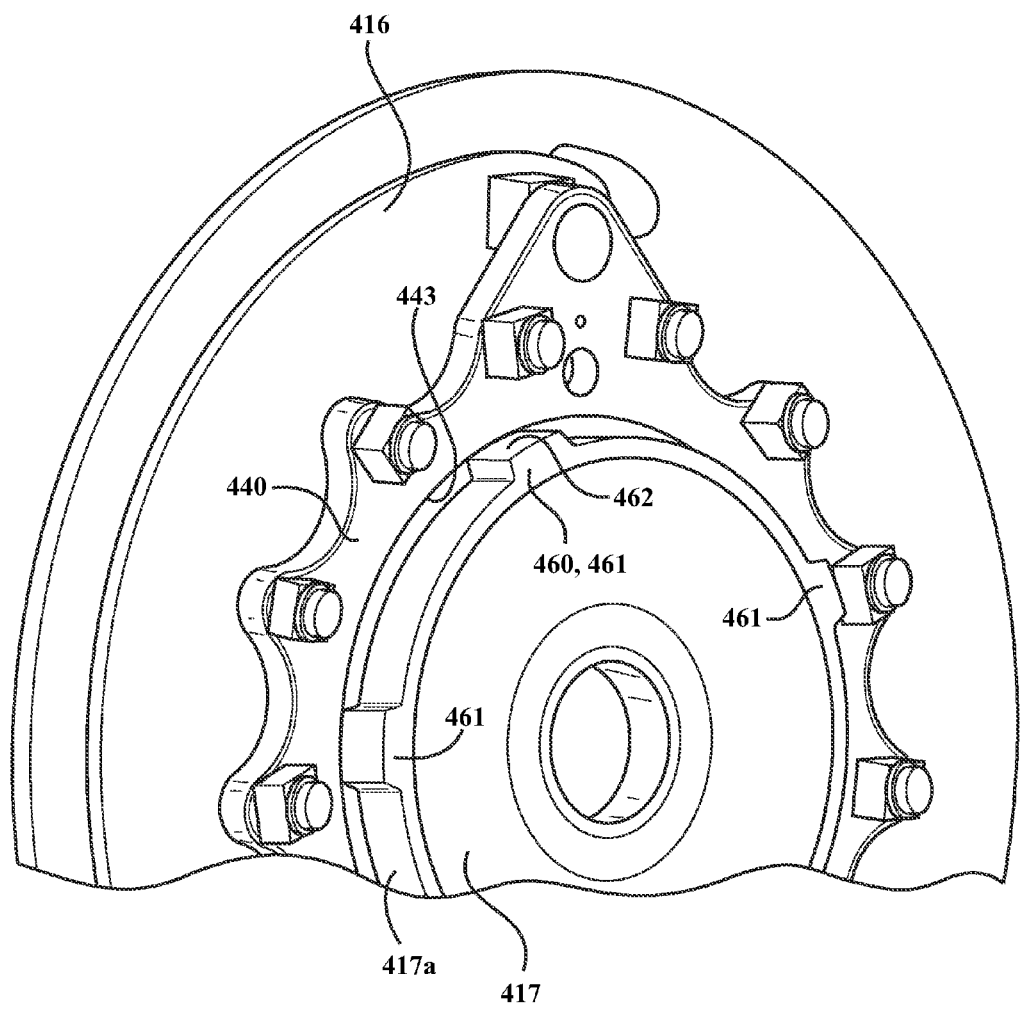
FIG. 18 is a partial perspective end view of an alternative embodiment turbocharger in which the bearing housing supports an adjustment ring having a circular central opening, and a nose portion of the bearing housing includes piloting surface features that engage the adjustment ring's radially inward facing edge.

Referring to FIG. 18, in another embodiment, the adjustment ring 440 is supported on the bearing housing nose portion 417 so as to be a) centered on the rotational axis R and thus radially located relative to the bearing housing, b) axially located relative to the vane pack 50, and c) rotatable about the rotational axis R. To this end, bearing housing nose portion 417 has surface features 460 that center the adjustment ring 440 relative to the nose portion 417 and reduce surface contact area. In this embodiment, the adjustment ring inner edge 443 has a circular profile when viewed along the rotational axis R.

The surface features 460 protrude radially outward from the radially outward-facing surface 417a of the nose portion 417 so as to pilot the adjustment ring 440 relative to the bearing housing 416. In the illustrated embodiment, the surface features 460 include equidistantly circumferentially spaced, radially outwardly extending protrusions 461 that each define a contact area 462 that engages the adjustment ring inner edge 443, and provide relief portions 466 between adjacent contact areas 462. The number, shape, and spacing of the protrusions 461 are determined based on the requirements of the specific application, and optimized to maximize the durability with minimal increase in friction. It is understood that the surface features 460 may be formed integrally with the nose portion 417 as shown, or, alternatively, may be formed on an insert having an outer edge with surface features 460 defining a non-circular profile when viewed along the rotation axis R.

Although the adjustment ring 40 includes a radially outward-facing outer edge 45 that has a scalloped profile when viewed along the rotational axis R, the adjustment ring 40 is not limited to this configuration. For example, in some embodiments, the radially outward-facing outer edge 45 has a circular profile when viewed along the rotational axis R.

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible within the scope of the following claims.

What is claimed, is:

1. A turbocharger (1) comprising
a bearing housing (16) including
a bore (15) that defines a longitudinal axis (R), and
a nose portion (17) that protrudes axially from one end of the bearing housing (16) and at least partially surrounds the bore (15);
a turbine housing (4) secured to the bearing housing (16) and defining an exhaust gas inlet (6), an exhaust gas outlet (8) and a volute (10) disposed between the exhaust gas inlet (6) and the exhaust gas outlet (8);
a turbine wheel (12) disposed in the turbine housing (4) between the volute (10) and the exhaust gas outlet (8); and
a variable turbine geometry (VTG) device (29) disposed in the turbine housing (4) between the volute (10) and the turbine wheel (12), the VTG device (29) including pivotable vanes (30) that control the flow of exhaust gas to the turbine wheel (12), and
an adjustment ring (40) that controls the rotational orientation of the vanes (30), the adjustment ring (40) rotatably supported on the nose portion (17) and wherein the adjustment ring (40) includes a radially-outward facing outer edge (45) that has an inwardly scalloped profile comprising a plurality of rounded, radially outwardly-protruding apexes and a plurality of radially inward-facing scallops alternating along the inwardly scalloped profile relative to the radially-outward facing outer edge (45) and wherein each apex of the plurality of rounded, radially outwardly-protruding apexes defines a hole.

2. The turbocharger (1) of claim 1, wherein one of a radially inward-facing edge (43) of the adjustment ring (40) and a radially outward-facing surface (17a) of the nose portion (17) comprises piloting surface features (60) that center the adjustment ring (40) relative to the nose portion (17).

3. The turbocharger (1) of claim 2, wherein the piloting surface features (60) comprise surface features (60) formed on the radially inward-facing edge of the adjustment ring (40).

4. The turbocharger (1) of claim 2, wherein the piloting surface features (60) comprise circumferentially spaced profile segments (61) formed on the radially inward-facing edge of the adjustment ring (40), each profile segment (61)

defining contact area (62) having a curvature that corresponds to the curvature of the nose portion (17).

5. The turbocharger (1) of claim 1 wherein a radially inward-facing edge (43) of the adjustment ring (40) comprises piloting surface features (60) that center the adjustment ring (40) relative to the nose portion (17), and the piloting surface features (60) include a profile segment (61) having a contact area (62), a first relief portion (65) that is recessed relative to and adjoins one end (63) of the contact area (62), and a second relief portion (66) that is recessed relative to and adjoins an opposed end (64) of the contact area (62).

6. The turbocharger (1) of claim 1 wherein a radially inward-facing edge (43) of the adjustment ring (40) comprises piloting surface features (60) that center the adjustment ring (140) relative to the nose, and the piloting surface features (60) include a profile segment (61) having a contact area (62) that engages the nose portion (17), a ramp portion (65) that is angled relative to and adjoins one end (63) of the contact area (62), and a relief portion (66) that adjoins an opposed end (64) of the contact area (62) and is radially spaced from the nose portion (17).

7. The turbocharger (1) of claim 5, wherein the profile segment (61) when viewed along the longitudinal axis (R) provides the radially inward-facing edge (43) of the adjustment ring (40) with an irregular profile that extends circumferentially along a segment of the adjustment ring inner edge (43) and is repeated along the circumference of the adjustment ring inner edge (43) to provide a regularly repeating profile pattern along the adjustment ring inner edge (43).

8. The turbocharger (1) of claim 2, wherein the piloting surface features (460) comprise surface features (461) formed on the radially outward-facing surface (17a) of the nose portion (17).

9. The turbocharger (1) of claim 2, wherein the piloting surface features (460) comprise circumferentially spaced profile segments (461) formed on the radially outward-facing surface (17a) of the nose portion (17), each profile segment (461) defining a contact area (462) that engages the adjustment ring (440).

10. The turbocharger (1) of claim 1, wherein
the bearing housing (16) includes an insert (80) that surrounds the nose portion (17a) and provides a bearing surface for the adjustment ring (40),
the adjustment ring (40) is rotatably supported on the insert (80),
the insert (80) is formed of a material that is different than the material used to form the bearing housing nose portion (17a), and
one of a radially inward-facing edge (43) of the adjustment ring (40) and a radially outward-facing surface (81) of the insert (80) comprises piloting surface features (60) that center the adjustment ring (40) relative to the nose portion (17).

11. An adjustment ring (40) configured to control the rotational orientation of vanes (30) of a variable turbine geometry (VTG) device (29) of a turbocharger (1), the adjustment ring (40) comprising the form of an annular plate and including a radially inward-facing inner edge (43) that defines a central opening (44), the inner edge (43) having a non-circular profile and comprising piloting surface features (60) that define a bearing surface upon which the adjustment ring (40) is supported relative to turbocharger (1); and
wherein the adjustment ring (40) includes a radially-outward facing outer edge (45) that has an inwardly scalloped profile comprising a plurality of rounded, radially outwardly-protruding apexes and a plurality of radially inward-facing scallops alternating along the inwardly scalloped profile relative to the radially-outward facing outer edge (45) and wherein each apex of the plurality of rounded, radially outwardly-protruding apexes defines a hole.

12. The adjustment ring (40) of claim 11, wherein the piloting surface features (60) comprise circumferentially spaced profile segments (61) formed on the radially inward-facing inner edge (43) of the adjustment ring (40), each profile segment (61) defining a curved contact area (62).

13. The adjustment ring (40) of claim 11 wherein the piloting surface features (60) include a profile segment (61) having a contact area (62), a first relief portion (65) that is recessed relative to and adjoins one end (63) of the contact area (62), and a second relief portion (66) that is recessed relative to and adjoins an opposed end (64) of the contact area (62).

14. The adjustment ring (40) of claim 13, wherein the profile segment (61) provides the radially inward-facing edge (43) of the adjustment ring (40) with an irregular profile that extends circumferentially along a segment of the inner edge (43) and is repeated along the circumference of the inner edge (43) to provide a regularly repeating profile pattern along the inner edge (43).

* * * * *